United States Patent
Ming et al.

(10) Patent No.: US 8,358,437 B2
(45) Date of Patent: Jan. 22, 2013

(54) METHOD FOR COMPENSATING FOR COLOR VARIATIONS ACROSS A PRINTED PAGE USING MULTIPLE COLOR PROFILES

(75) Inventors: Wei Ming, Cupertino, CA (US); Hiroshi Tomita, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1029 days.

(21) Appl. No.: 11/865,019

(22) Filed: Sep. 30, 2007

(65) Prior Publication Data
US 2009/0086290 A1    Apr. 2, 2009

(51) Int. Cl.
*H04N 1/60*    (2006.01)
*G06T 5/00*    (2006.01)

(52) U.S. Cl. ........ 358/1.9; 358/2.1; 358/3.23; 358/3.24; 358/3.26; 358/1.14; 358/518; 358/520

(58) Field of Classification Search ............ 358/1.1–1.2, 358/1.9, 3.26–3.27, 504, 538
See application file for complete search history.

(56) References Cited

U.S. PATENT DOCUMENTS

| | | | |
|---|---|---|---|
| 5,589,948 A * | 12/1996 | Itezono | 358/449 |
| 5,625,391 A | 4/1997 | Hirabayashi et al. | |
| 5,635,967 A * | 6/1997 | Klassen | 347/43 |
| 5,644,411 A * | 7/1997 | Tamagaki et al. | 358/529 |
| 5,696,889 A * | 12/1997 | Morikawa | 358/1.9 |
| 5,768,425 A * | 6/1998 | Praveen et al. | 358/3.22 |
| 5,966,461 A * | 10/1999 | Harrington | 382/167 |
| 6,124,945 A | 9/2000 | Ishihara et al. | |
| 6,417,932 B1 * | 7/2002 | Hirota et al. | 358/1.2 |
| 6,629,746 B2 * | 10/2003 | Waldner et al. | 347/19 |
| 6,654,143 B1 * | 11/2003 | Dalal et al. | 358/1.9 |
| 6,980,328 B2 * | 12/2005 | Hudson | 358/1.9 |
| 7,114,790 B2 * | 10/2006 | Seki et al. | 347/5 |
| 7,609,894 B2 * | 10/2009 | Zaklika et al. | 382/224 |
| 7,675,659 B2 * | 3/2010 | Ogatsu et al. | 358/518 |
| 7,684,077 B2 * | 3/2010 | Maeda | 358/1.18 |
| 7,777,915 B2 * | 8/2010 | Kuo et al. | 358/1.9 |
| 2006/0077488 A1 | 4/2006 | Zhang et al. | |
| 2006/0077489 A1 * | 4/2006 | Zhang et al. | 358/504 |
| 2007/0146742 A1 * | 6/2007 | Klassen | 358/1.9 |
| 2007/0291289 A1 | 12/2007 | Kuo et al. | |

FOREIGN PATENT DOCUMENTS

| | | |
|---|---|---|
| JP | 05-110839 A | 4/1993 |
| JP | 10-341347 A | 12/1998 |
| JP | 2004072220 A * | 3/2004 |

OTHER PUBLICATIONS

Japanese Patent Office Machine Translation of JP2004-072220.*
Japanese Office Action, dated Jul. 24, 2012, in a counterpart Japanese patent application, No. JP 2008-240112.

* cited by examiner

*Primary Examiner* — Richard Zhu
(74) *Attorney, Agent, or Firm* — Chen Yoshimura LLP

(57) ABSTRACT

A method for compensating for color variations introduced by printer hardware limitations and other factors is described. First, the extent of color variation throughout a printed page is determined. Based on this determination, each page is partitioned into a plurality of image areas. A color profile is generated for each image area. The partition and the multiple color profiles are stored in the printer. In an actual printing process, the page of image to be printed is divided into a plurality of image areas based on the paper size and the stored partition, and the respective stored color profiles for the image areas are retrieved and used to process the digital image for printing.

5 Claims, 3 Drawing Sheets

METHOD FOR COMPENSATING FOR COLOR VARIATIONS ACROSS A PRINTED PAGE USING MULTIPLE COLOR PROFILES

This application is related to commonly owned patent application entitled "Method for Compensating for Color Variations across a Printed Page Using Multiple-Pass Printing," application Ser. No. 11/864,487, filed Sep. 28, 2007, now pending.

BACKGROUND OF THE INVENTION

1. Field of the Invention

This invention relates to a printing method and related apparatus, and in particular, it relates to a printing method and apparatus that compensate for color variations across a printed page caused by printer hardware limitations and precision of assembly of machine parts.

2. Description of Related Art

Due to hardware limitations and precision of assembly of machine parts, a printer is often unable to generate colors uniformly throughout a page, and as a result color variations across the page are often observed in a printed page of image. For example, the same color (i.e. color having the same values in the input digital image data) printed in an upper portion of the page and in a lower portion of the page may appear to be slightly different. In other words, the printer has different color characteristics in different portions of a physical page. This is especially the case for larger format printers, such as printers that can print pages of 11×17 inches or larger.

SUMMARY

The present invention is directed to a method and related apparatus for compensating for color variations introduced by printer hardware limitations and precision of assembly of machine parts.

An object of the present invention is to generate printed pages with reduced color variation throughout the page.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for reducing color variation across a page of image printed by a printer, which includes: (a) printing a full size page of engine test chart using the printer; (b) measuring the printed engine test chart to obtain color values at different locations of the page; (c) based on the measured color values, determining a page partition for dividing the page into two or more image areas; (d) generating a color profile for each image area; and (e) storing the page partition and the color profile for each image area in the printer.

In another aspect, the present invention provides a method for printing a page of image using a printer, which includes: (a) receiving a page of digital image data to be printed; (b) retrieving page partition information stored in the printer, the page partition information specifying a partition of a full size page into two or more image areas; (c) detecting a paper size of the page of image to be printed; (d) dividing the page of image to be printed into two or more image areas based on the detected paper size and the retrieved page partition information; (e) retrieving color profiles associated with to the image areas; (f) processing the digital image data, wherein the digital image data in each image area is processed using the color profile associated with that image area; and (g) printing the processed image data.

In another aspect, the present invention provides a printer which includes: a controller for processing digital image data to be printed and controlling the print engine, the controller including a processor and a memory; wherein the memory stores page partition information which specifies a partition of a full size page into two or more image areas, and wherein the controller is programmed to control the print engine to carryout the above described printing process.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for compensating for color variations across a printed page introduced by printer hardware limitations and precision of assembly of machine parts. First, for each printer model or each individual printer, the extent of color variation throughout a printed page is determined. Based on this determination, each page is partitioned into a plurality of image areas. A color profile is generated for each image area. The partition and the multiple color profiles are stored in the printer. In an actual printing process, the page of image to be printed is divided into a plurality of image areas based on the paper size and the stored partition, and the respective stored color profiles for the image areas are retrieved and used to process the digital image for printing.

Figure 1:
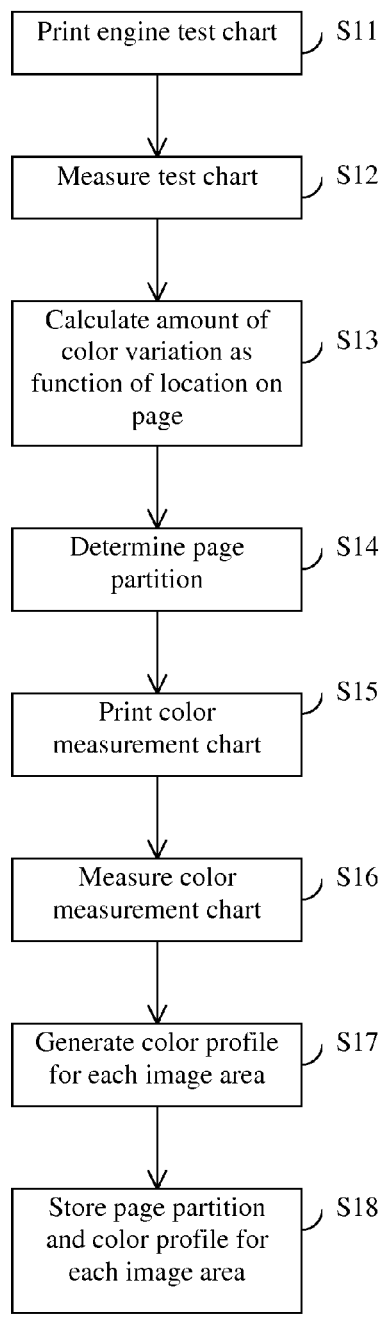
FIG. 1 illustrates a process for determining page partition and multiple color profiles for a printer or printer model according to an embodiment of the present invention.

Embodiments of the present invention are explained in more detail with reference to FIGS. 1 and 2. FIG. 1 illustrates a process of partitioning the full printable area of the printer into a plurality of areas and generating a color profile for each image area. First, a full size (i.e. size of the full printable size of the printer) engine test chart is printed using the printer (step S11). The engine test chart is a chart that has a plurality of color patches repeated throughout the page. A printer typically provides a default engine test chart that can be readily printed. Then, the printed engine test chart is measured to obtain color values at different locations of the page (step S12). Preferably, a special purpose spectrometer for measuring printed colors is used for this measurement, but other suitable apparatus may be used too. An amount of color variation, such as color difference or density difference, is calculated for various locations throughout the page (step S13). In one example, the amount of color variation is the difference between the measured color values and design target values specified by the manufacture. In another example, the amount of color variation is the difference between the measured color values at each location of the page relative to a predetermined point on the page (e.g. the center, the upper-left hand corner, etc.). Based on the amount of color difference as a function of location, the full size page is partitioned into multiple image areas (step S14). This step may be performed manually. For example, if the calculation shows that the amount of color variation is relatively large in the paper (medium) feeding direction, but relatively small in the transverse direction (the direction perpendicular to the paper feeding direction), the page may be partitioned into two (or more) areas in the paper feeding direction but not partitioned in the transverse direction.

After the page is partitioned, a full size color measurement chart is printed with the printer's color management features turned off, where each image area contains a full color measurement chart (step S15). A color measurement chart is a chart that includes a large number of color patches of various colors. A color measurement chart is provided by a software utility commonly referred to as a profile maker for the purpose of generating a color profile. In step S15, such a chart is resized and repeated on the page so that each image area includes a full color measurement chart. Then, the printed full size color measurement chart is measured to obtain color values for each color patch in each image area (step S16). Preferably, a special purpose built-in spectrophotometer for measuring printed colors is used for this measurement, but other suitable apparatus, such as a general purpose spectrophotometer, (CM-2600d available from Konica Minolta Sensing America, Inc.), a calorimeter (for instance, CR-400 available from Konica Minolta Sensing America, Inc.) and so on, may be used too. Based on the measurement, a color profile is generated for each image area (step S17). A color profile represents a mapping of input color values (e.g. RGB values) to the color values used by the printer to actually generate a color, for example, CMYK values. The CMYK values determine how the color inks or toners of cyan (C), magenta (M), yellow (Y) and black (K) are mixed to print the color represented by the input color values. The color profile is typically in the form of a lookup table. Step S17 may be performed using a profile maker software utility which calculates color profiles based on measurements obtained from the color measurement chart and a set of target color values. Because the same target color values are used to generate all of the color profiles for the multiple image areas, the color profiles will compensate for the variation in the printer's color characteristics in different image areas. For example, if the color characteristics of a particular image area are such that the red color is relatively underrepresented, the color profile for this image area will enhance the red color. As a result, the same input color values printed in different image areas will have substantially the same actual printed color.

The page partition and the color profile for each image area are stored in the printer for future use (step S18).

The partition process illustrated in FIG. 1 may be carried out during the manufacturing process. Alternatively, or in addition, the partition process illustrated in FIG. 1 may be performed by the user from time to time, as the color characteristics of the printer may drift slowly over time. Further, the process may be performed for each model of printers by the manufacturer if it is determined that the hardware limitations and other factors causing color variation are relatively consistent within each printer model. Alternatively, the process may be performed for each individual printer.

Figure 2:
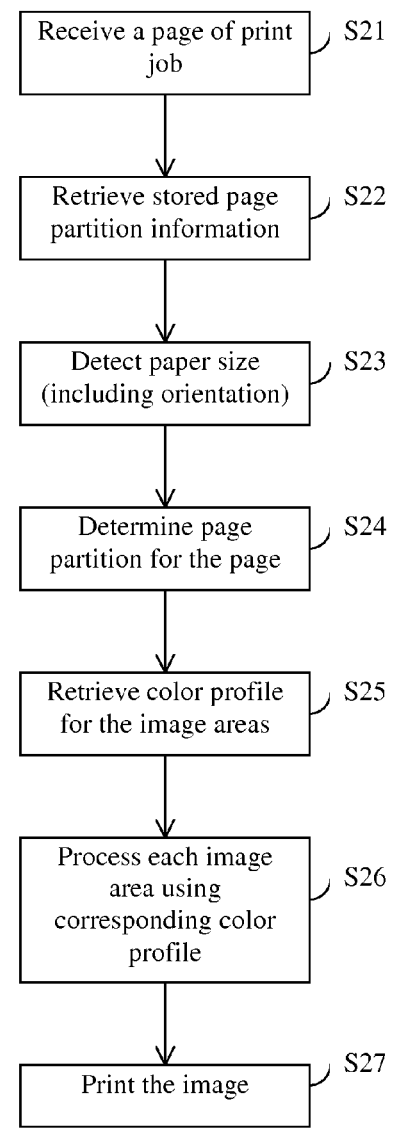
FIG. 2 illustrates a printing process using multiple color profiles that reduces color variations across a printed page according to an embodiment of the present invention.

FIG. 2 shows a process carried out by a printer when printing a page of image using the stored multiple color profiles. When a page of print job is received (step S21), the printer retrieves the stored page partition information (step S22), and detects the paper size of the page to be printed (step S23). (Here, paper size includes orientation. For example, a letter sized paper in the portrait orientation may be considered 8.5 by 11 inches, whereas a letter sized paper in the landscape orientation may be considered 11 by 8.5 inches.) Based on this information, the printer determines the page partition for the current page and divides the page into two or more image areas (step S24). This may be done by comparing the paper size of the current page with the full size page (i.e. the full printable area of the printer) to determine which image areas are covered by the current paper size. The stored color profiles for the relevant image areas are retrieved (step S25), and used to process the corresponding image areas (step S28). The processed image is then printed (step S27).

Figure 3:
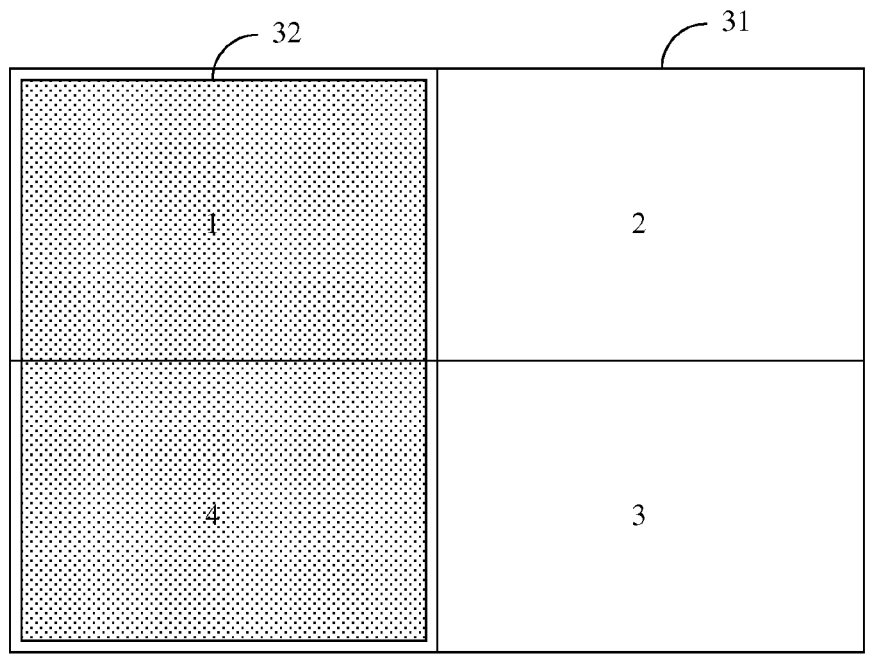
FIG. 3 illustrates one example of a page partition and printing with multiple color profiles.

FIG. 3 illustrates an example of a page partition and printing of a page using multiple color profiles. The full printable area of the printer is represented by the area 31, 17×11 in size in this example, and is partitioned into four image areas 1 through 4. The color profiles for these four image areas are generated in the process shown in FIG. 1 and stored in the printer. The shaded area 32 represents the page of printing medium (e.g. paper) in an actual printing process. In this example, the paper is 8.5×11 inches in size and occupies images areas 1 and 4 of the partition. During printing, the paper is divided into two image areas and the stored color profiles for image areas 1 and 4 are retrieved and used to process the two image areas.

Figure 4:
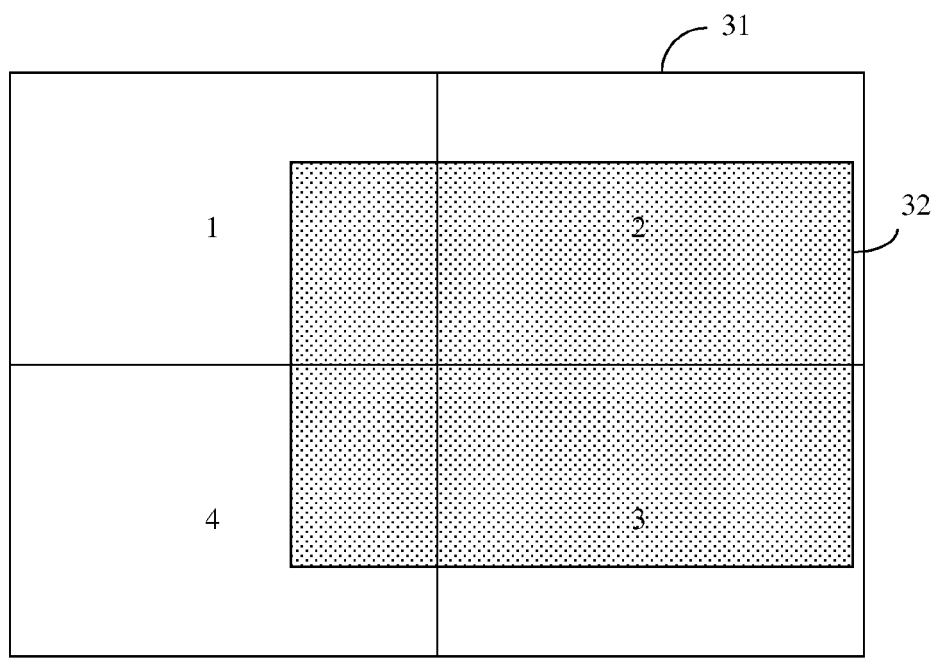
FIG. 4 illustrates another example of a page partition and printing with multiple color profiles.

FIG. 4 illustrates another example of a page partition and printing of a page using multiple color profiles. The full printable area 31 of the printer is partitioned into four image areas in the same way as shown in FIG. 3. Unlike in FIG. 3, in the example of FIG. 4, the paper 32 is 11×8.5 in size (i.e. letter size in the landscape orientation), and partially occupies image areas 1, 2, 3 and 4. Thus, during printing, the paper is divided into four image areas as shown, and the color profiles for image areas 1, 2, 3 and 4 are retrieved and used to process the four image areas. Alternatively (and more preferably), in this situation, the digital image may be rotated by 90 degrees, and printed using two image areas as shown in FIG. 3.

Optionally, additional image processing may be carried out at the boundaries between image areas to smooth out the discontinuities in color profiles. For example, when there is a region in the input image with a solid color or continuous color tone that extends across a boundary between two image areas, the boundary region may be smoothed out by changing the color values for a number of lines of pixels on both sides of the boundary so that they vary linearly. Another option, if an object with a solid color extends over a boundary, is to use one color profile for the object.

Figure 5:
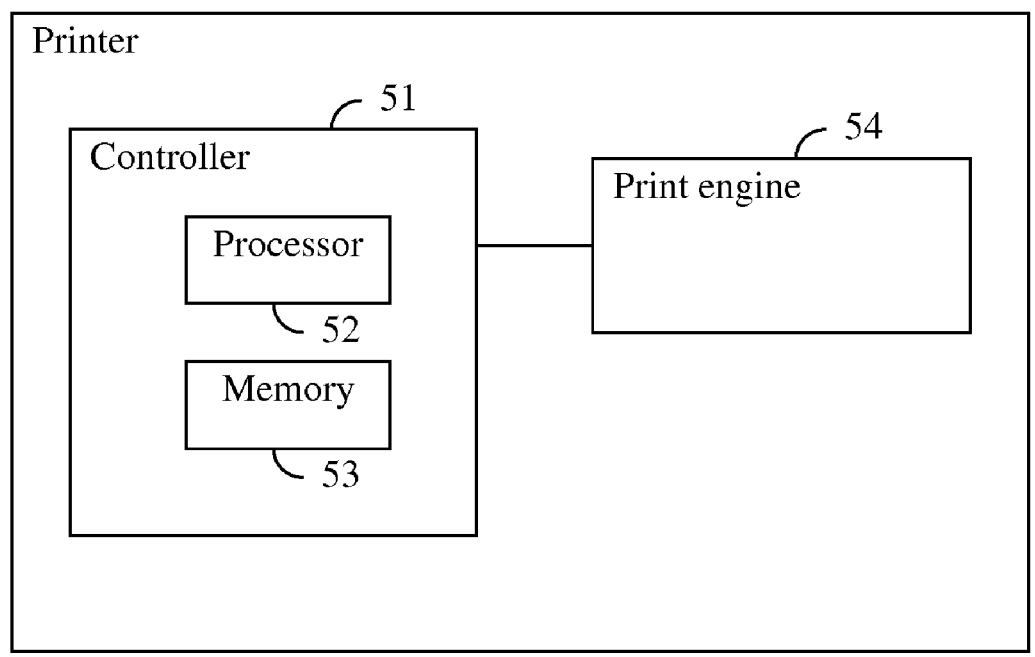
FIG. 5 schematically illustrates a printer on which a printing method according to embodiments of the present invention may be implemented.

FIG. 5 is a schematic block diagram of a printer in which methods according to embodiments of the present invention may be implemented. The printer includes a controller 51 which includes a processor 52 and a memory 53, and a print engine 54. Other portions of the printer are not shown. The memory 53 stores the page partition information and the multiple color profiles for the image areas. The image processing is performed by the processor 52. The controller 51 controls the print engine 54 and implements the printing method described above. The structures of the print engine are familiar to those skilled in the printer art and will not be described here.

It will be apparent to those skilled in the art that various modification and variations can be made in the color variation compensation method and apparatus of the present invention without departing from the spirit or scope of the invention. Thus, it is intended that the present invention cover modifications and variations that come within the scope of the appended claims and their equivalents.

What is claimed is:

1. A method for reducing color variation across a page of image to be printed by a printer, comprising:
   (a) printing a full size page of engine test chart using the printer, the full size page corresponding to a full printable area of the printer;
   (b) measuring the printed engine test chart to obtain color values at different locations of the full size page;
   (c) calculating an amount of color variation for a plurality of locations on the full printable area of the printer, and based on the calculated amount of color variations and independent of any image to be printed, determining a page partition for dividing the full printable area of the printer into two or more image areas;
   (d) generating a color profile for each image area; and
   (e) storing the page partition and the color profile for each image area in the printer.

2. The method of claim 1, wherein step (d) includes:
   (d1) printing a page of full size color measurement chart, the color measurement chart including a full color measurement chart in each image area;
   (d2) measuring the printed full size color measurement chart to obtain color measurement values; and
   (d3) based on the color measurement values and a set of target values, generating a color profile for each image area.

3. The method of claim 1, wherein step (c) includes calculating an amount of color variation for a plurality of locations on the full printable area of the printer.

4. A method for printing a page of image using a printer, comprising:
   (a) receiving a page of digital image data to be printed;
   (b) retrieving page partition information stored in the printer, the page partition information specifying a partition of a full size page corresponding to a full printable area of the printer into two or more image areas;
   (c) detecting a paper size of the page of image to be printed;
   (d) dividing the page of image to be printed into two or more image areas based on the detected paper size and the retrieved page partition information, by comparing the detected paper size with the full printable area of the printer to determine which image areas of the full printable area are covered by the detected paper size wherein the retrieved page partition information has been determined based on an amount of color variation for a plurality of locations on the full printable area of the printer;
   (e) retrieving color profiles associated with the image areas;
   (f) processing the digital image data, wherein the digital image data in each image area is processed using the color profile associated with that image area; and
   (g) printing the processed image data.

5. A printer, comprising:
   a print engine; and
   a controller for processing digital image data to be printed and controlling the print engine, the controller including a processor and a memory;
   wherein the memory stores page partition information which specifies a partition of a full size page into two or more image areas, and
   wherein the controller is programmed to control the print engine to carry out a printing process which includes:
   (a) receiving a page of digital image data to be printed;
   (b) retrieving page partition information stored in the printer, the page partition information specifying a partition of a full size page corresponding to a full printable area of the printer into two or more image areas;
   (c) detecting a paper size of the page of image to be printed;
   (d) dividing the page of image to be printed into two or more image areas based on the detected paper size and the retrieved page partition information, by comparing the detected paper size with the full printable area of the printer to determine which image areas of the full printable area are covered by the detected paper size wherein the retrieved page partition information has been determined based on an amount of color variation for a plurality of locations on the full printable area of the printer;
   (e) retrieving color profiles associated with the image areas;
   (f) processing the digital image data, wherein the digital image data in each image area is processed using the color profile associated with that image area; and
   (g) printing the processed image data.

* * * * *